US012633787B2

(12) United States Patent　　　　(10) Patent No.:　US 12,633,787 B2
Koo et al.　　　　　　　　　　　　　(45) Date of Patent:　　May 19, 2026

(54) INTERIOR PERMANENT MAGNET SYNCHRONOUS MOTOR

(71) Applicant: SAMSUNG ELECTRONICS CO., LTD., Suwon-si (KR)

(72) Inventors: Bonkil Koo, Suwon-si (KR); Byoungsoo Ko, Suwon-si (KR); Hongseok Kim, Suwon-si (KR); Hyungchul Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 18/386,756

(22) Filed: Nov. 3, 2023

(65) Prior Publication Data

US 2024/0128815 A1　　Apr. 18, 2024

Related U.S. Application Data

(63) Continuation of application No. PCT/KR2023/013840, filed on Sep. 14, 2023.

(30) Foreign Application Priority Data

Oct. 5, 2022　(KR) ........................ 10-2022-0127108

(51) Int. Cl.
H02K 1/27　　　　(2022.01)
H02K 1/276　　　(2022.01)
(Continued)

(52) U.S. Cl.
CPC ............. H02K 1/276 (2013.01); H02K 21/16 (2013.01); H02K 29/03 (2013.01); H02K 2213/03 (2013.01)

(58) Field of Classification Search
CPC ........ H02K 1/276; H02K 21/16; H02K 29/03; H02K 2213/03; H02K 1/2766; H02K 21/14
See application file for complete search history.

(56) References Cited

U.S. PATENT DOCUMENTS 8,106,557 B2　1/2012　Yoshino et al.
8,853,909 B2　10/2014　Aota et al.
(Continued)

FOREIGN PATENT DOCUMENTS

CN　　1283889 A　　2/2001
JP　　2978057 B2　11/1999
(Continued)

OTHER PUBLICATIONS

Takahashi et al., "Reluctance Torque and Output Improvement of Concentrated Winding IPMSM Using Asymmetric Rotor", 2021 24th International Conference on Electrical Machines and Systems (ICEMS), 2021, pp. 1233-1238.
(Continued)

*Primary Examiner* — Thomas Truong
(74) *Attorney, Agent, or Firm* — STAAS & HALSEY LLP

(57) ABSTRACT

An interior permanent magnet synchronous motor including a stator including a plurality of teeth, and coils wound around the plurality of teeth; and a rotor configured to be rotatable in a hollow region of the stator. The rotor includes a plurality of permanent magnets in the rotor, and a slit which is arranged within a polar arc angle τ (τ=360°/P, where P represents a number of poles of the rotor) and toward a lead side of the polar arc angle τ, and arranged to be inclined in an opposite direction of a rotation direction of the rotor.

14 Claims, 16 Drawing Sheets

(51) Int. Cl.
     *H02K 21/16*          (2006.01)
     *H02K 29/03*          (2006.01)

(56)          References Cited

U.S. PATENT DOCUMENTS

| | | |
|---|---|---|
| 10,003,226 B2 | 6/2018 | Kim et al. |
| 11,705,766 B2 | 7/2023 | Chowdhury et al. |
| 2008/0018190 A1 | 1/2008 | Takahata et al. |
| 2009/0026865 A1 | 1/2009 | Aota et al. |
| 2010/0156234 A1* | 6/2010 | Hoemann ............. H02K 1/276 |
| | | 310/216.106 |
| 2011/0163624 A1 | 7/2011 | Hori et al. |
| 2015/0145371 A1 | 5/2015 | Kim et al. |
| 2017/0117762 A1 | 4/2017 | Takahata et al. |
| 2019/0052137 A1* | 2/2019 | Yabe ....................... F04B 39/00 |
| 2020/0220398 A1 | 7/2020 | Takahashi et al. |
| 2021/0222922 A1 | 7/2021 | Lee et al. |
| 2022/0060070 A1 | 2/2022 | Kitao et al. |
| 2022/0085671 A1 | 3/2022 | Chowdhury et al. |

FOREIGN PATENT DOCUMENTS

| | | |
|---|---|---|
| JP | 2007-174738 | 7/2007 |
| JP | 2008-278591 | 11/2008 |
| JP | 4340632 B2 | 10/2009 |
| JP | 2010-161832 A | 7/2010 |
| JP | 2015-119547 | 6/2015 |
| KR | 10-1065991 B1 | 9/2011 |
| KR | 10-2013-0062872 A | 6/2013 |
| KR | 10-2015-0059974 | 6/2015 |
| KR | 10-1791544 | 10/2017 |
| KR | 10-2022-0037386 | 3/2022 |
| WO | WO 2020/194390 A1 | 10/2020 |

OTHER PUBLICATIONS

International Search Report dated Dec. 29, 2023 issued in PCT Application No. PCT/KR2023/013840.
Written Opinion dated Dec. 29, 2023 issued in PCT Application No. PCT/KR2023/013840.
Extended European Search Report issued Oct. 7, 2025 for Application No. 23875103.6.

* cited by examiner

INTERIOR PERMANENT MAGNET SYNCHRONOUS MOTOR

CROSS REFERENCE TO RELATED APPLICATIONS

The present application is a continuation of international application PCT/KR2023/013840 filed on Sep. 14, 2023 in the Korean Intellectual Property Office (KIPO), which claims benefit of priority to KR Patent Application No. 10-2022-0127108 filed on Oct. 5, 2022 in KIPO. The contents of the above applications are hereby incorporated by reference.

BACKGROUND

1. Field

The disclosure relates to an interior permanent magnet motor that reduces iron loss of a tooth of a stator.

2. Description of the Related Art

An interior permanent magnet synchronous motor is generally configured such that a plurality of permanent magnets is embedded at a certain distance inside of the rotor. The interior permanent magnet synchronous motor may be configured such that a rotor core adjacent with a pore within a polar arc angle with a permanent magnet may be present.

The interior permanent magnet synchronous motor may form a slit at the rotor core within the polar arc angle to lower the torque ripple or raise an output density. The interior permanent magnet synchronous motor as described above has had a problem of iron loss increasing as saturation of a stator tooth is increased due to an additional magnetic flux.

SUMMARY

Aspects of embodiments of the disclosure will be set forth in part in the description which follows and, in part, will be apparent from the description, or may be learned by practice of the presented embodiments.

According to one or more embodiments, an interior permanent magnet synchronous motor includes a stator including a plurality of teeth, and coils wound around the plurality of teeth; and a rotor configured to be rotatable in a hollow region of the stator. The rotor includes a plurality of permanent magnets in the rotor, and a slit which is arranged within a polar arc angle τ and toward a lead side of the polar arc angle τ, and arranged to be inclined in an opposite direction of a rotation direction of the rotor. The polar arc angle τ satisfies the following equation:

$$\tau = 360°/P$$

where P represents a number of poles of the rotor.

According to one or more embodiments, the slit may be positioned in a slit arrangement range φ in the polar arc angle τ, and arranged to be inclined within a slit inclination range θ. The slit arrangement range φ and the slit inclination range θ may respectively satisfy the following equations:

$$0.2\,\tau \le \phi \le 0.5\,\tau$$

$$\frac{180°}{P} \le \theta \le \frac{180°}{P} + 90°$$

According to one or more embodiments, a pair of permanent magnets, among the plurality of permanent magnets, may be arranged in a V-shape within the polar arc angle τ. The slit may be arranged adjacently to a first permanent magnet, of the pair of permanent magnets, that is positioned at a lead based on the rotation direction of the rotor.

According to one or more embodiments, at least three permanent magnets, among the plurality of permanent magnets, may be arranged in a U-shape within the polar arc angle τ. The slit may be arranged adjacently to a first permanent magnet, of the at least three permanent magnets, that is positioned at a lead based on the rotation direction of the rotor.

According to one or more embodiments, a first permanent magnet, among the plurality of permanent magnets, may be arranged in an I-shape within the polar arc angle τ. The slit may be arranged adjacently to a portion of the first permanent magnet corresponding to a lead based on the rotation direction of the rotor.

According to one or more embodiments, the slit includes a plurality of slits which may be arranged with a distance therebetween. The plurality of slits may have different lengths. The plurality of slits may have common widths. The plurality of slits may have different widths.

According to one or more embodiments, the slit may be formed to become gradually narrower from a first end of the slit to a second end of the slit in the opposite direction of the rotation direction of the rotor.

According to one or more embodiments, the slit may be formed to become gradually wider from a first end of the slit to a second end of the slit in the opposite direction of the rotation direction of the rotor.

According to one or more embodiments, the slit may be convexly curved in the rotation direction of the rotor. The slit may be convexly curved in the opposite direction of the rotation direction of the rotor.

According to one or more embodiments, an interior permanent magnet synchronous motor includes a stator; and a rotor configured to be installed rotatably in a hollow region of the stator. The rotor includes a plurality of permanent magnets in the rotor, and a slit arranged within a polar arc angle τ and toward a lead side of the polar arc angle τ. The slit is arranged to be inclined within a slit inclination range θ. The polar arc angle τ and the slit inclination range θ respectively satisfy the following equations:

$$\tau = 360°/P$$

$$\frac{180°}{P} \le \theta \le \frac{180°}{P} + 90°$$

where P represents a number of poles of the rotor.

The slit may be positioned in a slit arrangement range φ in the polar arc angle τ. The slit arrangement range φ may satisfy the following equation:

$$0.2\tau \le \phi \le 0.5\tau$$

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Embodiments described below are provided as example embodiments to assist in the understanding of the disclosure, and it is to be understood that the disclosure may be variously modified and realized differently from the embodiments described herein. However, in describing the disclosure below, in case it is determined that the detailed description for related known technologies or elements may unnecessarily confuse the gist of the disclosure, the detailed description thereof and the detailed drawing thereof will be omitted. In addition, the accompanied drawing may be shown exaggerated in measurement of some elements rather than being shown according to its actual dimension to assist in the understanding of the disclosure.

Terms such as first and second may be used to describe various elements, but it should be noted that the elements are not to be limited by the terms. The terms may be used only for the purpose of differentiating one element from another element. For example, a first element may be designated as a second element without departing from the scope and spirit of the disclosure, and likewise, the second element may also be designated as the first element.

The terms used in the embodiments of the disclosure may be interpreted to have meanings generally understood to one of ordinary skill in the art unless otherwise defined.

Terms such as a 'tip-end,' a 'rear-end,' an 'upper-part,' a 'lower-part,' a 'upper-end,' and a 'lower-end' used in the disclosure may be defined based on a drawings, and a shape and position of each element is not limited by the term.

An expression 'same' used in the disclosure may not only refer to being a match wholly, but also refer to including a difference of an extent that takes into consideration a processing error range.

In addition thereto, in describing the disclosure, in case it is determined that the detailed description for related known technologies or configurations may unnecessarily confuse the gist of the disclosure, the detailed description thereof will be omitted.

Embodiments of the disclosure may provide an interior permanent magnet synchronous motor that reduces iron loss by lowering saturation of a tooth of a stator by forcing a direction of magnetic flux that flows to the tooth of the stator.

An interior permanent magnet synchronous motor according to one or more examples of the disclosure will be described below with reference to the accompanied drawings.

Figure 1:
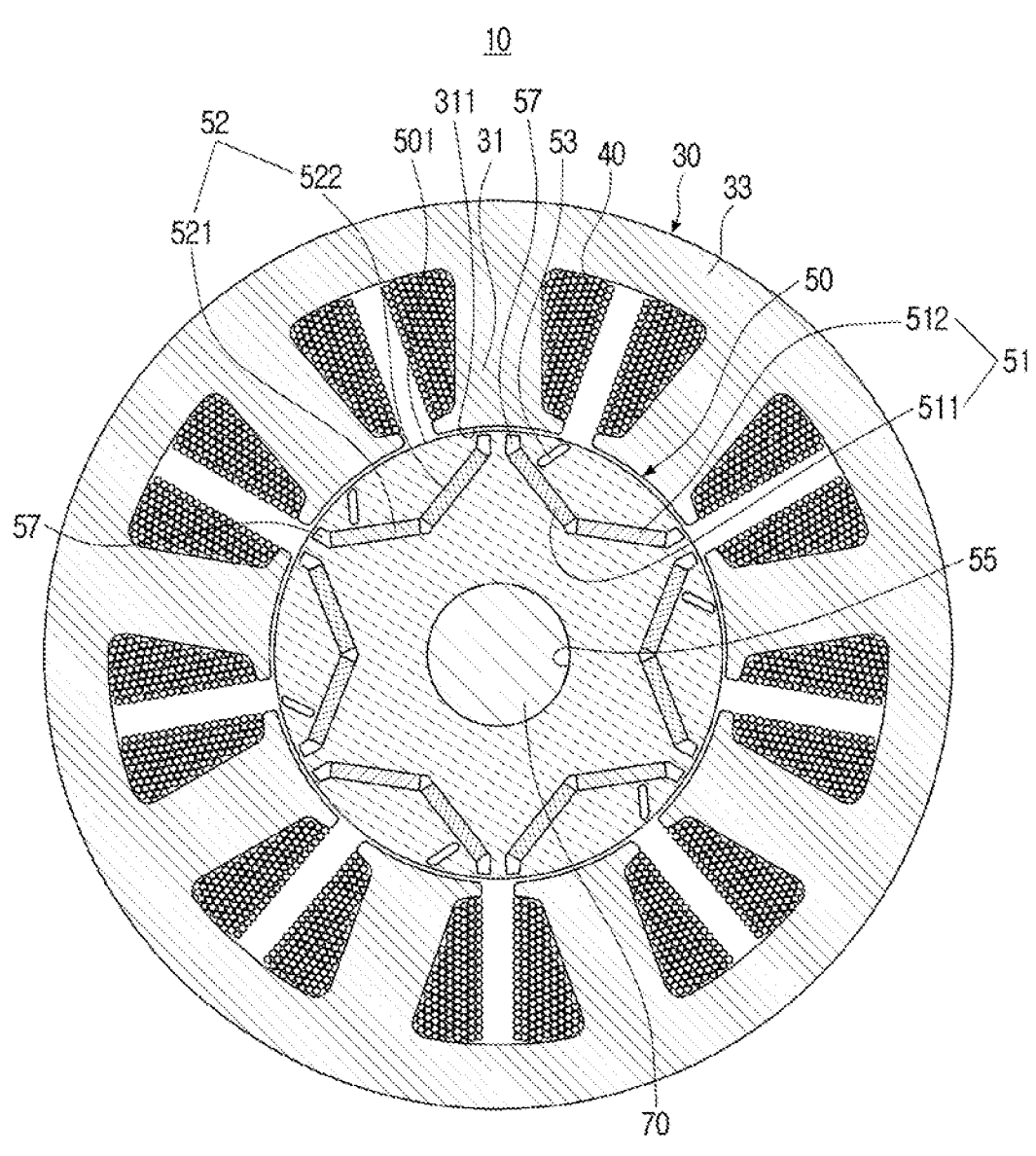
FIG. 1 is a cross-sectional view illustrating an interior permanent magnet synchronous motor according to one or more embodiments of the disclosure.

FIG. 1 is a cross-sectional view illustrating an interior permanent magnet synchronous motor according to one or more embodiments of the disclosure.

Referring to FIG. 1, an interior permanent magnet synchronous motor 10 according to one or more embodiments may include a stator 30 and a rotor 50.

The stator 30 may include a yoke part 33 formed in a cylindrical shape and a plurality of teeth 31 protruded toward a center of the stator 30 at an inner surface of the yoke part 33.

The plurality of teeth 31 may be installed spaced apart by a certain distance in a circumferential direction of the inner surface of the stator 30. In between the plurality of teeth 31, a plurality of coil grooves, in which coils 40 may be contained, may be formed. Each of the plurality of teeth 31 may be wound with the coils 40.

The rotor 50 may be formed in a cylindrical shape. The rotor 50 may be installed to be rotatable to the stator 30 concentrically with the stator 30. The rotor 50 may be installed at the center of the stator 30 such that an outer circumferential surface 501 has a certain distance from a tip-end part 311 of the teeth 31 of the stator 30. In a shaft hole 55 formed at a center of the rotor 50, a rotation shaft 70 may be coupled.

A plurality of permanent magnets 51 and 52 may be installed at an inside of the rotor 50. For example, the plurality of permanent magnets 51 and 52 may be arranged between the outer circumferential surface 501 and the shaft hole 55 of the rotor 50.

The rotor 50 may be formed of an iron core, and at the iron core of the rotor 50, a plurality of magnet insertion holes 57 which are installed with permanent magnets 51 and 52 may be formed in a circumferential direction of the rotor 50. The plurality of magnet insertion holes 57 may be formed in a V-shape.

The plurality of permanent magnets 51 and 52 may be arranged by one pair each at each of the magnet insertion holes 57. For example, a pair of first permanent magnets 511 and 512 may be arranged at one magnet insertion hole 57, and a pair of second permanent magnet 521 and 522 may be arranged at a pair of second magnet insertion holes 57. The permanent magnets 511 and 512; 521 and 522 inserted by one pair each in each of the magnet insertion holes 57 may be arranged in the V-shape.

The plurality of permanent magnets 51 and 52 may have different polarities from one another. For example, the pair of first permanent magnets 511 and 512 may have a polarity of N-pole, and the pair of second permanent magnet 521 and 522 arranged adjacently to the pair of first permanent magnets 511 and 512 may have a polarity of S-pole. The plurality of permanent magnets 51 and 52 may be formed of a rare earth, for example, neodymium (Nd) or ferrite.

A plurality of slits 53 may be formed with a certain distance therebetween in a circumferential direction at the rotor 50. The plurality of slits 53 may be formed from one end to an opposite end of the rotor 50 parallel to the rotation shaft 70. The plurality of slits 53 may reduce iron loss of the stator 30 by improving magnetic flux density from being concentrated at the plurality of teeth 31 by blocking a flow of magnetic flux flowing to the plurality of teeth 31 of the stator 30.

The plurality of slits 53 may be provided at the rotor 50 to correspond by one each to the pair of permanent magnets, respectively. As to the plurality of slits 53, for example, 6 slits may be provided when 6 pairs of permanent magnets are arranged at the rotor 50 as shown in FIG. 1. Each slit 53 may be arranged at a position adjacent to the permanent magnet corresponding to a lead of a rotation direction (anti-clockwise direction in FIG. 1) of the rotor 50. In this case, each slit 53 may be arranged to be inclined in an opposite direction of the rotation direction of the rotor 50.

The plurality of slits 53 may obtain an iron loss reducing effect of the stator 30 according to points formed at the rotor 50 and an arrangement angle. An effective arrangement range and an effective arrangement angle range of the plurality of slits on the rotor for the iron loss reduction of the stator 30 will be described below.

Figure 2:
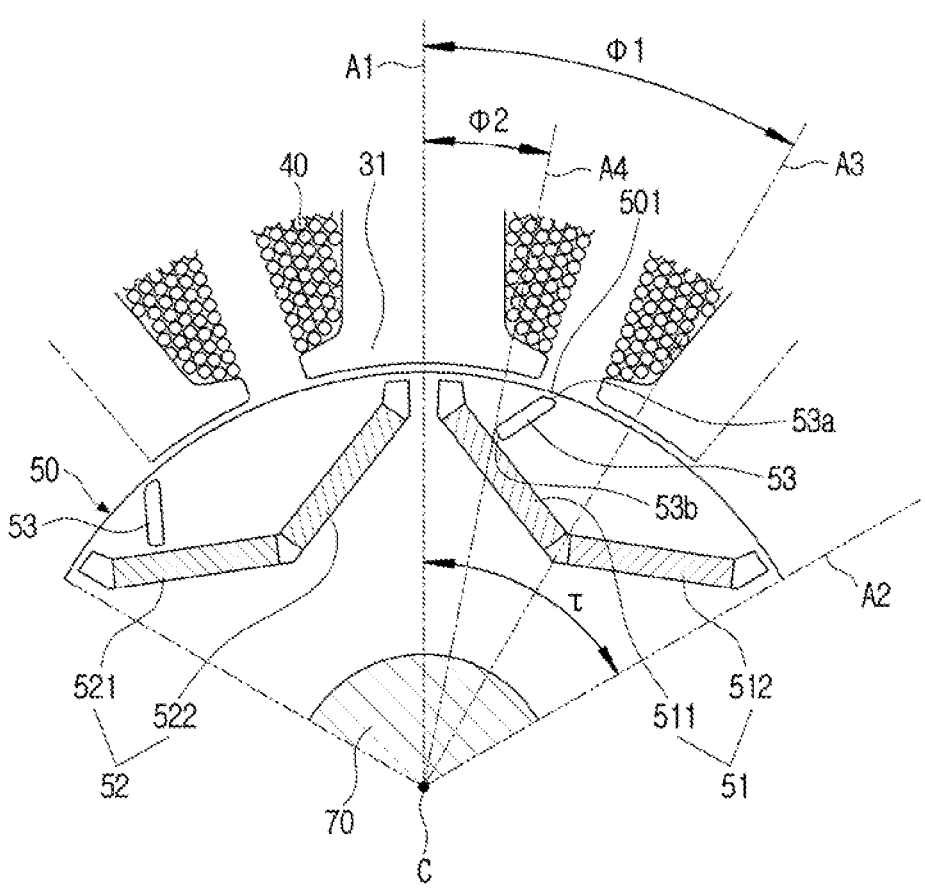
FIG. 2 is a view illustrating an arrangement range of a slit of an interior permanent magnet synchronous motor according to one or more embodiments of the disclosure.
Figure 3:
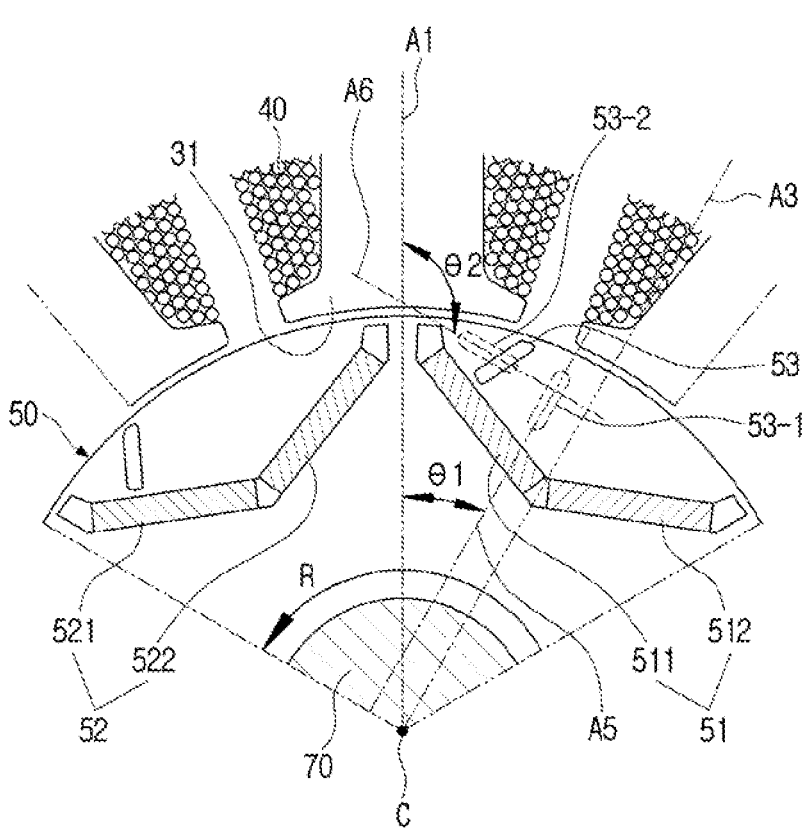
FIG. 3 is a view illustrating an angle range of a slit of an interior permanent magnet synchronous motor according to one or more embodiments of the disclosure.

FIG. 2 is a view illustrating an arrangement range of a slit of an interior permanent magnet synchronous motor according to one or more embodiments of the disclosure. FIG. 3 is a view illustrating an arrangement angle range of a slit of an interior permanent magnet synchronous motor according to one or more embodiments of the disclosure.

Referring to FIG. 2, the pair of permanent magnets 511 and 512 may be arranged between a first axis A1 which is arranged vertically passing a center point C of the rotor 50 and a second axis A2 which is rotated in the clockwise direction by a polar arc angle from the first axis A1 passing the center point C of the rotor 50.

The slits 53 may be arranged adjacently to the permanent magnet 511 positioned at a left side from among the pair of first permanent magnets 511 and 512 arranged within the polar arc angle τ. The polar arc angle τ may represent a polar arc angle corresponding to one polar arc when the number of poles of the rotor 50 is a P-number as in Equation 1 below:

$$\tau = 360°/P \qquad \text{[Equation 1]}$$

The slits 53 may be arranged to be inclined by a predetermined angle in the opposite direction (clockwise direction in FIG. 2) of the rotation direction R (anti-clockwise direction in FIG. 2) to which the rotor 50 rotates. The slits 53 may have a predetermined length, and may be arranged such that one end 53a is adjacent to the outer circumferential surface 501 of the rotor 50 and an opposite end 53b is adjacent to the left permanent magnet 511.

The slit 53 arranged within the polar arc angle τ may be positioned within a slit arrangement range φ as in Equation 2 below:

$$0.2\tau \leq \phi \leq 0.5\tau \qquad \text{[Equation 2]}$$

For example, the slit arrangement range φ included within the polar arc angle τ may be an area between a third axis A3 which is rotated by a first angle φ1 in the clockwise direction from the first axis A1 and a fourth axis A4 which is rotated by a second angle φ2 in the clockwise direction from the first axis A1.

Referring to FIG. 3, the slit 53 positioned within the slit arrangement range φ may be arranged to be inclined within a slit inclination range θ as in Equation 3 below:

$$\frac{180°}{P} \leq \theta \leq \frac{180°}{P} + 90° \qquad \text{[Equation 3]}$$

Here, P represents a number of poles of the rotor 50.

For example, a minimum value of the slit inclination range θ may be a third angle θ1 which is an angle from the first axis A1 to a fifth axis A5 that is parallel to the third axis A3. When the slit 53 is inclined to the third angle θ1, which is illustrated as 53-1 in FIG. 3, the slit 53 may be arranged based on the fifth axis A5. The third angle θ1 may correspond to 180°/P.

A maximum value of the slit inclination range θ may be a fourth angle θ2 which is an angle from the first axis A1 to a sixth axis A6 which is orthogonal to the fifth axis A5. When the slit 53 is inclined to the fourth angle θ2, which is illustrated as 53-2 in FIG. 3, the slit 53 may be arranged based on the sixth axis A6. The fourth angle may be a value in which 90° is added to 180°/P in the opposite direction of the rotation direction R of the rotor 50.

Figure 4:
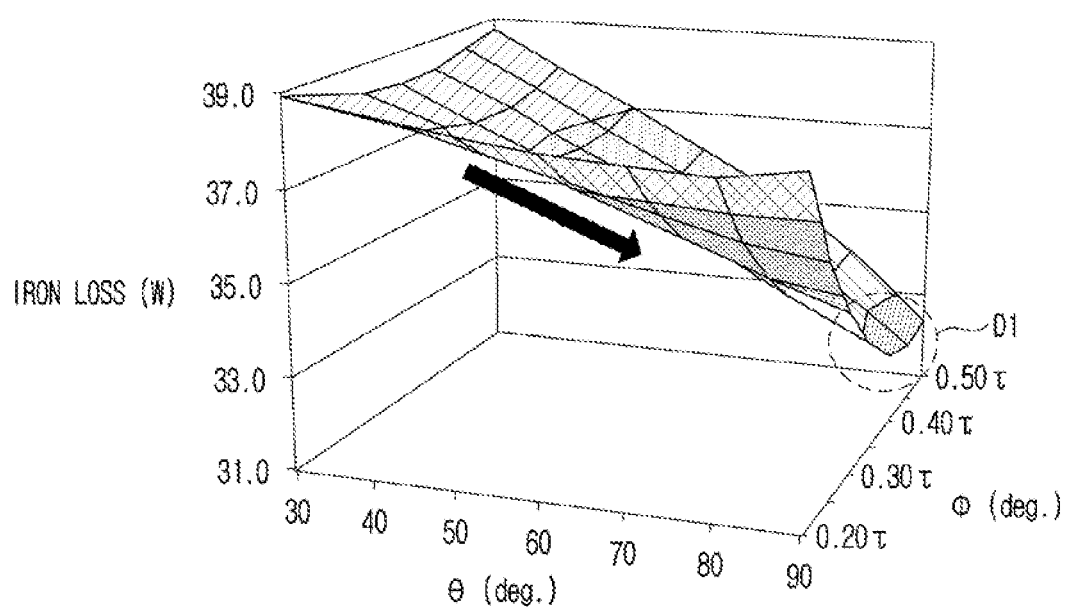
FIG. 4 is a graph illustrating a change in iron loss according to an inclination angle of a slit formed at a rotor of an interior permanent magnet synchronous motor according to one or more embodiments of the disclosure.

FIG. 4 is a graph illustrating a change in iron loss according to an inclination angle of a slit formed at a rotor of an interior permanent magnet synchronous motor according to one or more embodiments of the disclosure.

Referring to FIG. 4, when the slit 53 is positioned in the slit arrangement range (0.4τ≤φ≤0.5τ) corresponding to D1 from among the slit arrangement range φ, iron loss may be decreased as the inclination angle of the slit 53 is increased in the opposite direction of the rotation direction R of the rotor 50.

Figure 5:
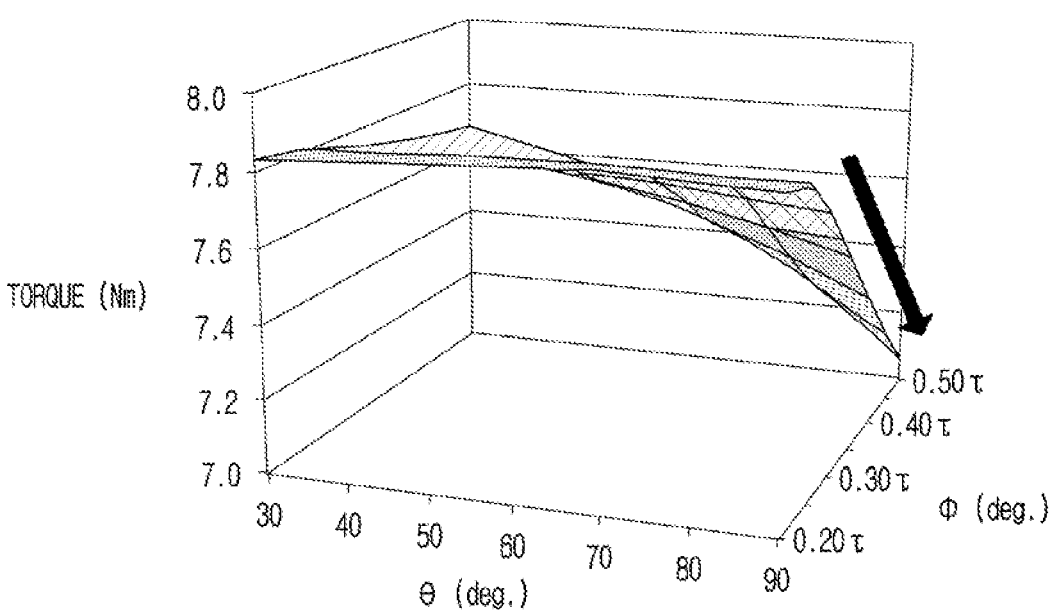
FIG. 5 is a graph illustrating a change in torque according to a position of a slit formed at a rotor of an interior permanent magnet synchronous motor according to one or more embodiments of the disclosure.

FIG. 5 is a graph illustrating a change in torque according to a position of a slit formed at a rotor of an interior permanent magnet synchronous motor according to one or more embodiments of the disclosure.

Referring to FIG. 5, a torque of the interior permanent magnet synchronous motor 10 may be reduced as the position of the slit 53 moves from the first axis A1 toward a direction adjacent to the third axis A3, that is, toward a center of the polar, within the slit arrangement range φ.

Figure 6:
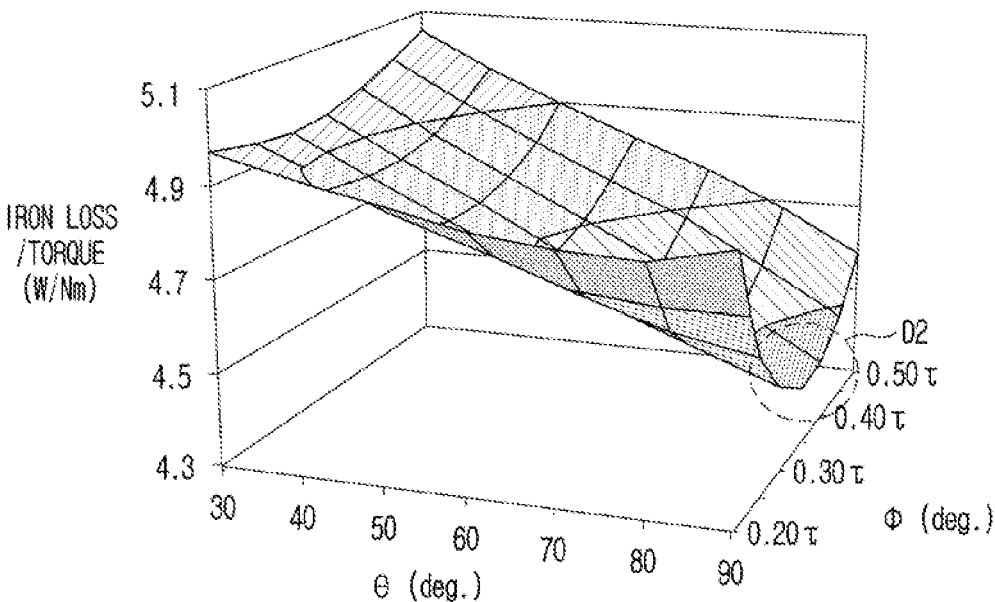
FIG. 6 is a graph illustrating an iron loss per a unit torque of an interior permanent magnet synchronous motor according to one or more embodiments of the disclosure.

FIG. 6 is a graph illustrating an iron loss per a unit torque of an interior permanent magnet synchronous motor according to one or more embodiments of the disclosure.

Referring to FIG. 6, when the slit 53 is positioned in the slit arrangement range (0.3τ≤φ≤0.45τ) corresponding to D2 from among the slit arrangement range φ, iron loss per unit torque is at a minimum.

Figure 7:
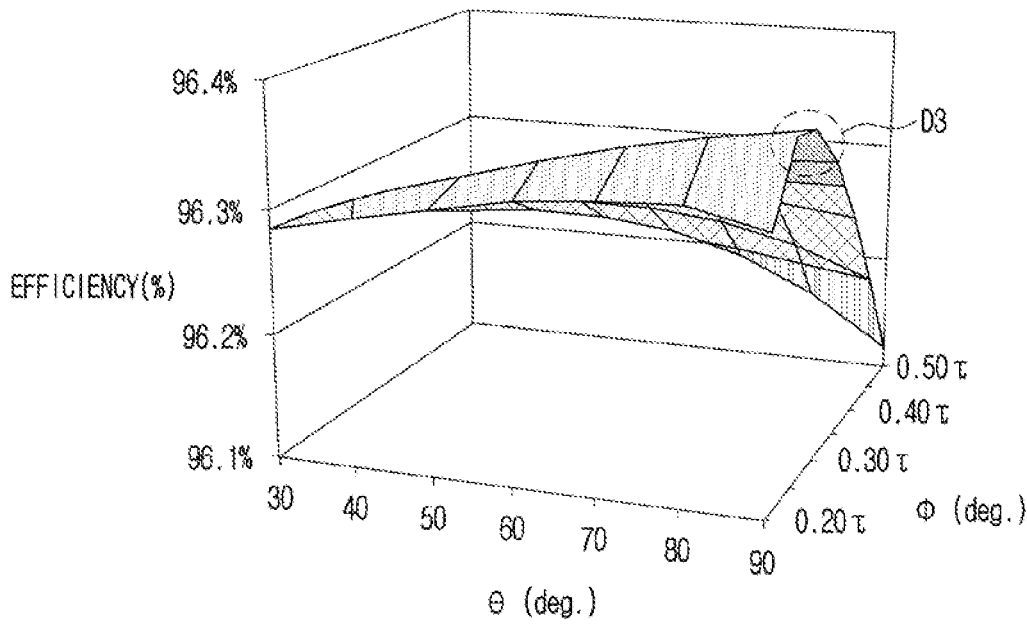
FIG. 7 is a graph illustrating an efficiency of an interior permanent magnet synchronous motor according to one or more embodiments of the disclosure.

FIG. 7 is a graph illustrating an efficiency of an interior permanent magnet synchronous motor according to one or more embodiments of the disclosure.

Referring to FIG. 7, when the slit 53 is positioned in the slit arrangement range (0.2τ≤φ≤0.4τ) corresponding to D3 from among the slit arrangement range φ, efficiency of the interior permanent magnet synchronous motor is at a maximum.

Figure 8:
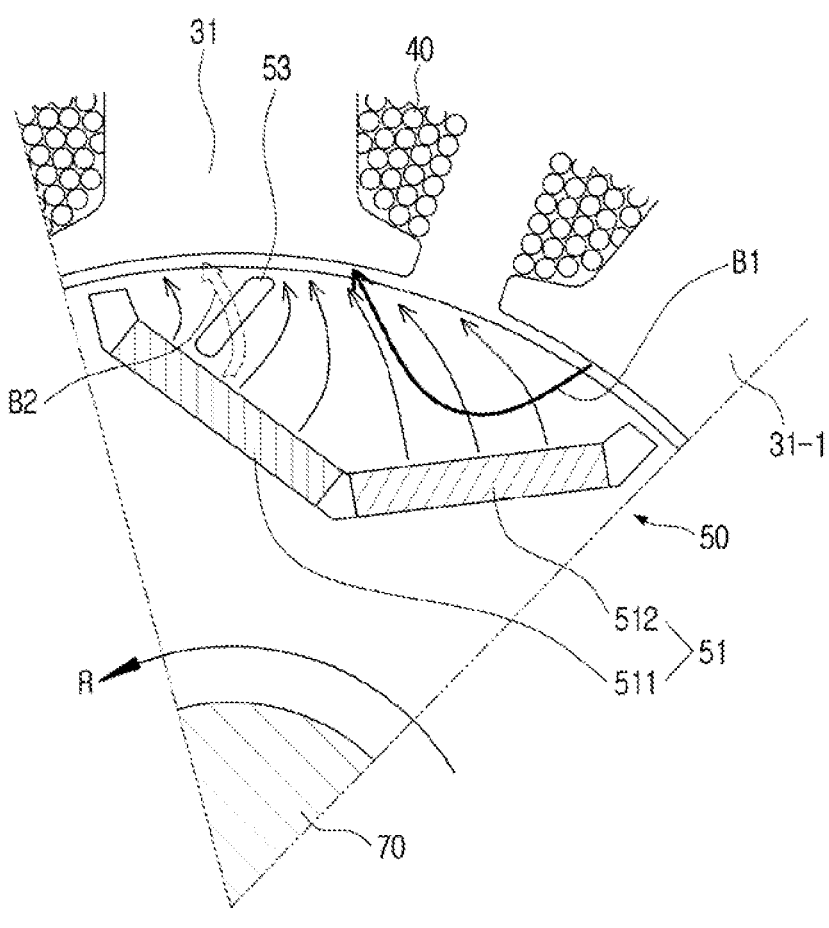
FIG. 8 is a view illustrating an example of magnetic flux being forced by a slit of an interior permanent magnet synchronous motor according to one or more embodiments of the disclosure.
Figure 9:
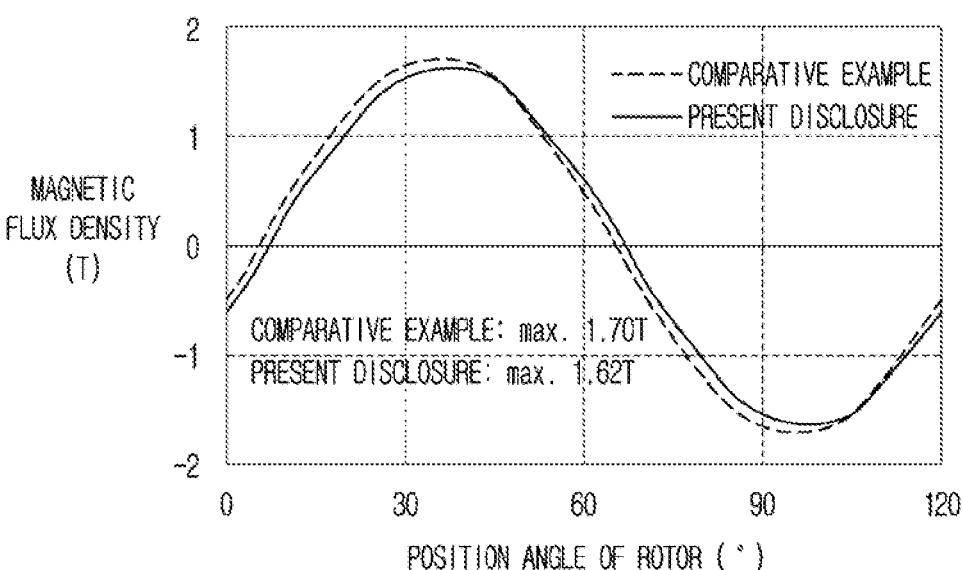
FIG. 9 is a graph comparing a magnetic flux density which is formed at a tooth of a stator of an interior permanent magnet synchronous motor according to one or more embodiments of the disclosure with that of an interior permanent magnet synchronous motor according to a comparative example.
Figure 10:
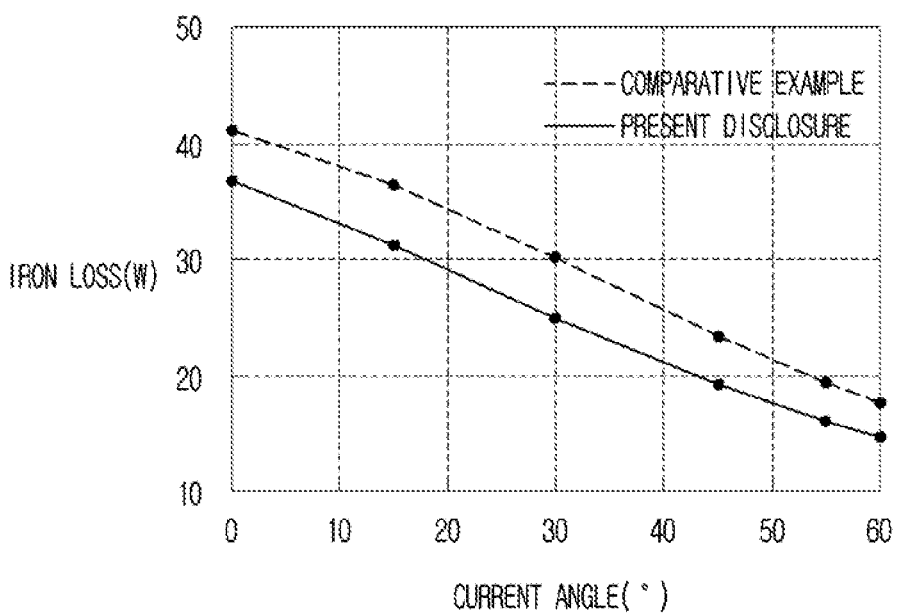
FIG. 10 is a graph comparing an iron loss of an interior permanent magnet synchronous motor according to one or more embodiments of the disclosure with that of an interior permanent magnet synchronous motor according to a comparative example.

FIG. 8 is a view illustrating an example of magnetic flux being forced by a slit of an interior permanent magnet synchronous motor according to one or more embodiments of the disclosure. FIG. 9 is a graph comparing a magnetic flux density which is formed at a tooth of a stator of an interior permanent magnet synchronous motor according to one or more embodiments of the disclosure with that of an interior permanent magnet synchronous motor according to a comparative example. FIG. 10 is a graph comparing an iron loss of an interior permanent magnet synchronous motor according to one or more embodiments of the disclosure with that of an interior permanent magnet synchronous motor according to a comparative example.

Referring to FIG. 8, when the slit 53 is arranged within the slit arrangement range φ and has an inclination angle within the slit inclination range θ, a portion B2 from among the magnetic fluxes B1 and B2 that flow to the tooth 31 of the stator 30 may be blocked by the slit 53. Accordingly, iron loss of the stator 30 may be reduced by preventing magnetic flux density from being concentrated at the tooth 31 of the stator 30.

Graphs of the comparative examples (dotted line) shown in FIG. 9 and FIG. 10 show of a slit formed at the rotor being arranged to be inclined toward the rotation direction of the rotor.

In one or more embodiments of the disclosure, the slit 53 is arranged to be inclined in the opposite direction of the rotation direction R of the rotor 50 and a portion B2 from among the magnetic fluxes B1 and B2 that flow to the tooth 31 of the stator 30 may be blocked by the slit 53 as shown in FIG. 8.

However, in the comparative example, the slit formed at the rotor may be arranged to be inclined in a similar direction as with the magnetic fluxes B1 and B2 that flow to the tooth 31 of the stator 30. Accordingly, the magnetic fluxes B1 and B2 that flow to the tooth 31 of the stator 30 may mostly flow to the tooth of the stator without being blocked by the slit in the comparative example.

As shown in FIG. 9, in one or more embodiments of the disclosure, a concentrated magnetic density of the stator is lower than that of the comparative example in a position angle range of the whole rotor. In addition, a maximum value of the magnetic flux density that is concentrated at the tooth of the stator may be 1.62 T in the disclosure, while shown as 1.7 T in the comparative example. Accordingly, a tooth concentration in the disclosure is reduced by approximately 4.7% than that of the comparative example.

Referring to FIG. 10, an iron loss according to a current angle is shown lower overall in one or more embodiments of the disclosure than the comparative example from the whole current angle range. Specifically, referring to Table 1 which corresponds to FIG. 10, a reduction ratio of iron loss in one or more embodiments of the disclosure is reduced by approximately 18% than the comparative example from the whole current angle range.

TABLE 1

| Current angle (°) | iron loss (W) of comparative example | iron loss (W) of present disclosure | Reduction rate (%) |
|---|---|---|---|
| 0 | 41.6 | 36.7 | −11.8 |
| 15 | 37 | 31.2 | −15.7 |
| 30 | 30.9 | 24.9 | −19.4 |
| 45 | 24.2 | 19.2 | −20.7 |
| 55 | 20.1 | 16.1 | −19.9 |
| 60 | 18.3 | 14.7 | −19.7 |
| Average: | | | −17.9 |

Figure 11:
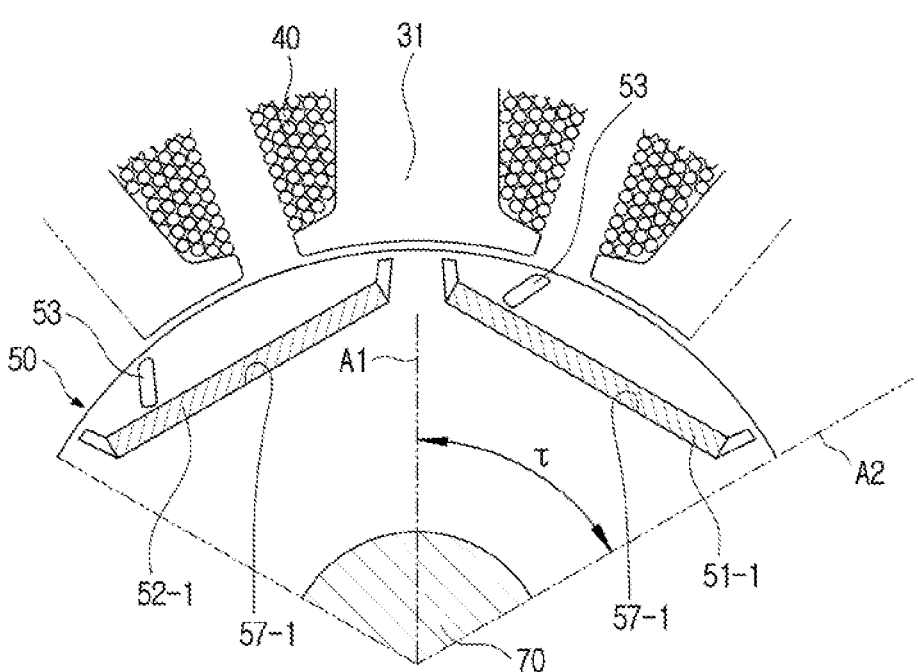
FIG. 11 is a view illustrating an example of a permanent magnet embedded at a rotor of an interior permanent magnet synchronous motor being arranged in an I-shape according to one or more embodiments of the disclosure.
Figure 12:
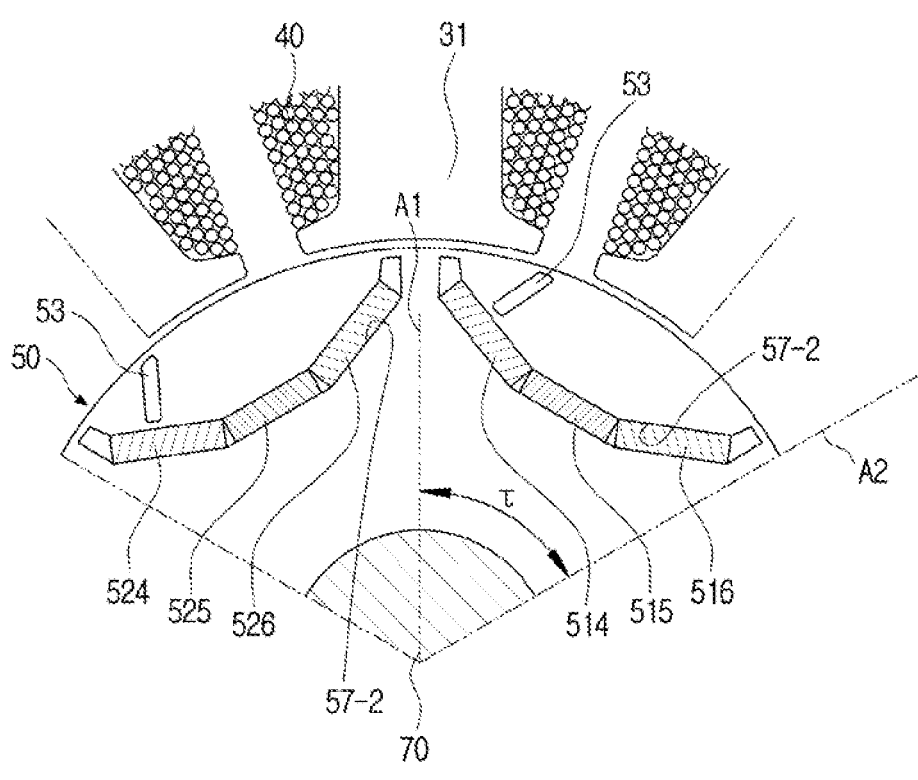
FIG. 12 is a view illustrating an example of a permanent magnet embedded at a rotor of an interior permanent magnet synchronous motor being arranged in a U-shape according to one or more embodiments of the disclosure.

FIG. 11 is a view illustrating an example of a permanent magnet embedded at the rotor of the interior permanent magnet synchronous motor being arranged in an I-shape according to one or more embodiments of the disclosure. FIG. 12 is a view illustrating an example of a permanent magnet embedded at the rotor of the interior permanent magnet synchronous motor being arranged in a U-shape according to one or more embodiments of the disclosure.

Referring to FIG. 11, the interior permanent magnet synchronous motor according to one or more embodiments of the disclosure may be configured such that the permanent magnet embedded at the rotor 50 is arranged in an I-shape (or a straight-line shape). In this case, the permanent magnet arranged within the polar arc angle τ may be one.

Magnet insertion holes 57-1 formed at the rotor 50 may be formed in an I-shape (or the straight-line shape). In FIG. 11, a permanent magnet 51-1 which is inserted to a right magnet insertion hole 57-1 and a permanent magnet 52-1 which is inserted to a left magnet insertion hole 57-1 may have different magnetic poles from each other.

As described above, if the permanent magnets 51-1 and 52-1 are embedded at the rotor 50 in an I-shape, the slits 53 corresponding to each of the permanent magnets 51-1 and 52-1 may be positioned within the slit arrangement range φ and arranged to be inclined at a predetermined inclination angle within the slit inclination range θ as described above. Accordingly, even when the permanent magnets 51-1 and 52-1 embedded at the rotor 50 are arranged in an I-shape, iron loss may be reduced by lowering a degree of concentration of the tooth 31 of the stator because the slits 53 are able to block the magnetic flux flowing to the tooth 31 of the stator.

Referring to FIG. 12, the interior permanent magnet synchronous motor according to one or more embodiments of the disclosure may be configured such that the permanent magnet embedded at the rotor 50 is arranged in a U-shape (or the straight-line shape). In this case, the permanent magnets arranged within the polar arc angle τ may be three.

Magnet insertion holes 57-2 formed at the rotor 50 may be formed in an approximate U-shape. In FIG. 12, three permanent magnets 514, 515, and 516 which are inserted to a right magnet insertion hole 57-2 and three permanent magnets 524, 525, and 526 which are inserted to a left magnet insertion hole 57-2 may have different magnetic poles from one another. For example, if the right three permanent magnets 514, 515, and 516 have magnetic poles of N-poles, the left three permanent magnets 524, 525, and 526 may have magnetic poles of S-poles.

The slit 53 corresponding to one permanent magnet 514 positioned at an outermost left side from among the right three permanent magnets 514, 515, and 516 may be positioned within the slit arrangement range φ and arranged to be inclined at a predetermined inclination angle within the slit inclination range θ as described above. Likewise, the slit 53 corresponding to one permanent magnet 524 positioned at the outermost left side from among the right three permanent magnets 524, 525, and 526 may be positioned within the slit arrangement range φ and arranged to be inclined at a predetermined inclination angle within the slit inclination range θ as described above.

Accordingly, even when the permanent magnets 514, 515, and 516; 524, 525, and 526 embedded at the rotor 50 are arranged in a U-shape, iron loss may be reduced by lowering the degree of concentration of the tooth 31 of the stator because the slits 53 are able to block the magnetic flux flowing to the tooth 31 of the stator.

Although the slits 53 provided at the rotor 50 have been described as having an approximate predetermined length and widths of one end thereof and an opposite end thereof have been described as being formed in a same straight-line form, the one or more embodiments are not limited thereto. For example, the slits as shown in FIG. 13 to FIG. 16 may have various shapes.

FIG. 13 to FIG. 16 are views illustrating shapes of slits formed at a rotor of an interior permanent magnet synchronous motor according to one or more embodiments of the disclosure.

Figure 13:
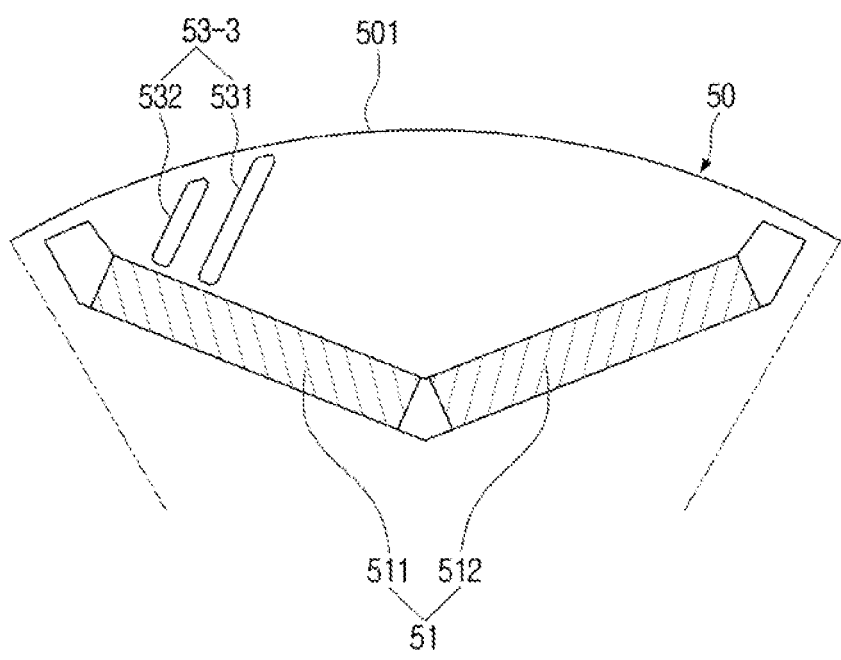
FIG. 13 to FIG. 16 are views illustrating shapes of slits formed at a rotor of an interior permanent magnet synchronous motor according to one or more embodiments of the disclosure.

Referring to FIG. 13, slits 53-3 may be positioned within the slit arrangement range φ and arranged to be inclined at a predetermined inclination angle within the slit inclination range θ as the slits 53 described above.

The slits 53-3 may include a first slit 531 and a second slit 532. The first slit 531 and the second slit 532 may have different lengths from one another. For example, as shown in FIG. 13, the first slit 531 which is arranged more closely to a center (part at which the pair of first permanent magnets 511 and 512 are contacted) of the pole than the second slit 532 may be formed such that a length thereof is longer than a length of the second slit 532.

In FIG. 13, the first slit 531 and the second slit 532 have been shown as having the same inclination angle, but are not limited thereto. For example, the first slit 531 and the second slit 532 may be arranged at different angles from each other within the slit inclination range θ.

In FIG. 13, the first slit 531 and the second slit 532 have been shown as having the same width, but are not limited thereto. For example, the first slit 531 and the second slit 532 may have different widths from each other.

The slits 53-3 have been described as including two slits 531 and 532, but are not limited thereto. For example, the slits 53-3 may include at least three slits. In this case, the at least three slits may be configured such that the width of each slit and the distance between the slits are suitably adjusted to be positioned within the slit arrangement range φ.

Figure 14:
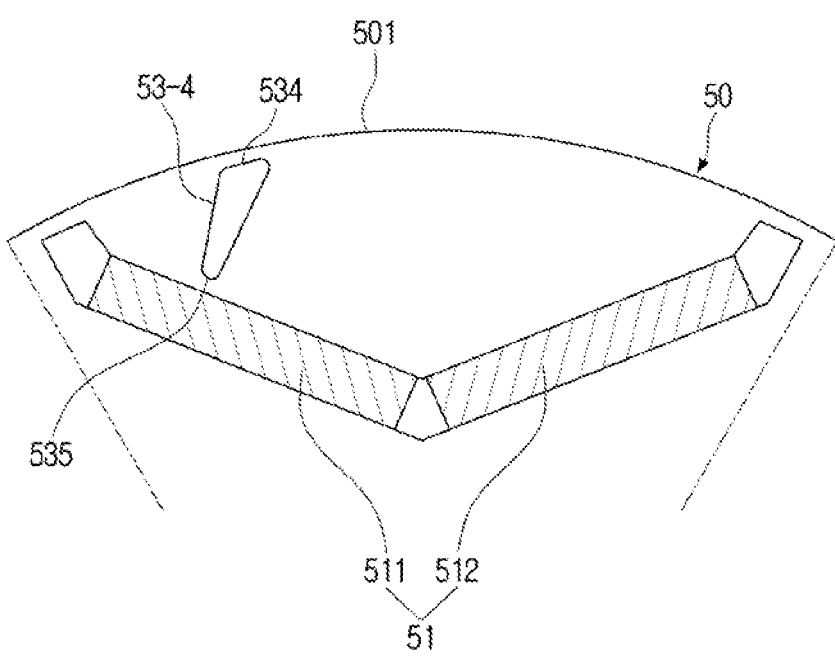

Referring to FIG. 14, a slit 53-4 may be positioned within the slit arrangement range φ and arranged to be inclined at a predetermined inclination angle within the slit inclination range θ as with the slit 53 described above.

The slit 53-4 may have a predetermined length and the widths of one end 534 thereof and an opposite end 535 thereof may be different. For example, the slit 53-4 may be configured such that a width of the one end 534 of the slit 53-4 adjacent to the outer circumferential surface 501 of the rotor 50 is formed wider than a width of the opposite end 535 of the slit 53-4 adjacent to the first permanent magnet 511. In this case, the width of the slit 53-4 may become gradually narrower from the one end 534 thereof toward the opposite end 535 thereof.

Figure 15:
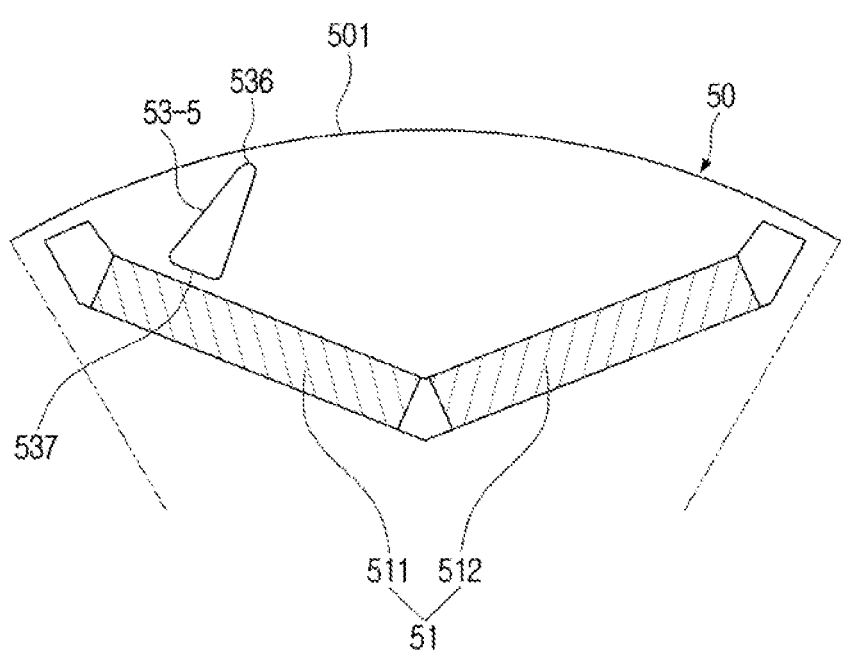

Referring to FIG. 15, a slit 53-5 may be positioned within the slit arrangement range φ and arranged to be inclined at a predetermined inclination angle within the slit inclination range θ as the slit 53 described above.

The slit 53-5 may have a predetermined length and the widths of one end 536 thereof and an opposite end 537 thereof may be different. For example, the slit 53-5 may be configured such that a width of the one end 536 of the slit 53-5 adjacent to the outer circumferential surface 501 of the rotor 50 is formed narrower than a width of the opposite end 537 of the slit 53-5 adjacent to the first permanent magnet 511. In this case, the width of the slit 53-5 may become gradually wider from the one end 536 thereof toward the opposite end 537 thereof.

Figure 16:
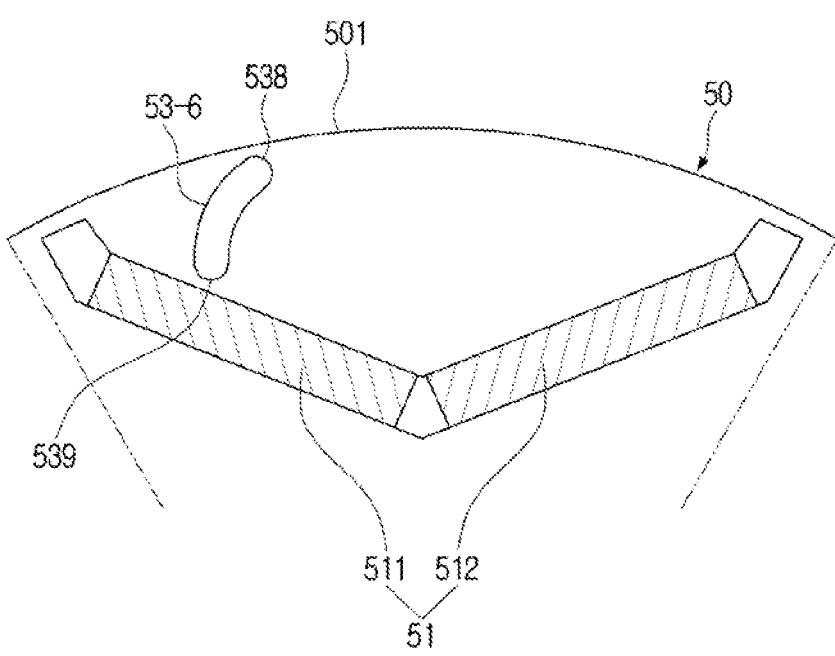

Referring to FIG. 16, a slit 53-6 may be positioned within the slit arrangement range (p and arranged to be inclined at a predetermined inclination angle within the slit inclination range θ as the slit 53 described above.

The slit 53-6 may have an overall curved shape. The slit 53-6 may be configured such that one end 538 is arranged adjacently to the outer circumferential surface 501 of the rotor 50 and an opposite end 539 is arranged adjacently to the first permanent magnet 511.

The slit 53-6 may have a convexly curved shape in the rotation direction R (referring to FIG. 3) of the rotor 50. However, the slit 53-6 may have a convexly curved shape in the opposite direction of the rotation direction R of the rotor 50.

In the above, the disclosure has been described with example methods. Terms used herein are for describing the disclosure, and are not to be understood as limiting. Various modifications in form and details may be made in the disclosure based on the description above. Accordingly, the disclosure may be freely realized without departing from the true spirit and full scope of the disclosure, including the appended claims and their equivalents, unless otherwise specified.

What is claimed is:

1. An interior permanent magnet synchronous motor, comprising:
   a stator including a plurality of teeth, and coils wound around the plurality of teeth; and
   a rotor configured to be installed rotatably in a hollow region of the stator,
   wherein the rotor includes:
      a plurality of permanent magnets in the rotor, and
      a plurality of slits, wherein each slit among the plurality of slits is positioned respectively in a slit arrangement range φ within a polar arc angle τ and toward a lead side of the polar arc angle τ, and arranged to be inclined in an opposite direction of a rotation direction of the rotor,
   the polar arc angle τ satisfies the following equation:

$$\tau = 360°/P$$

where P represents a number of poles of the rotor,
   the slit arrangement range φ satisfies the following equation:

$$0.2\tau \le \phi \le 0.5\tau, \text{ and}$$

the rotor is configured without slits outside the slit arrangement range φ.

2. The interior permanent magnet synchronous motor of claim 1, wherein
   each slit among the plurality of slits arranged to be inclined within a slit inclination range θ satisfied by the following equation:

$$\frac{180°}{p} \le \theta \le \frac{180°}{p} + 90°.$$

3. The interior permanent magnet synchronous motor of claim 2, wherein a pair of permanent magnets, among the plurality of permanent magnets, are arranged in a V-shape within the polar arc angle τ, and each slit among the plurality of slits is arranged adjacently to a first permanent magnet, of the pair of permanent magnets, that is positioned at a lead based on the rotation direction of the rotor.

4. The interior permanent magnet synchronous motor of claim 2, wherein at least three permanent magnets, among the plurality of permanent magnets, are arranged in a U-shape within the polar arc angle τ, and each slit among the plurality of slits is arranged adjacently to a first permanent magnet, of the at least three permanent magnets, that is positioned at a lead based on the rotation direction of the rotor.

5. The interior permanent magnet synchronous motor of claim 2, wherein a first permanent magnet, among the plurality of permanent magnets, is arranged in an I-shape within the polar arc angle τ, and each slit among the plurality of slits is arranged adjacently to a portion of the first permanent magnet corresponding to a lead based on the rotation direction of the rotor.

6. The interior permanent magnet synchronous motor of claim 2, wherein two or more slits among the plurality of slits are arranged within each polar arc angle τ with a distance therebetween.

7. The interior permanent magnet synchronous motor of claim 6, wherein the two or more slits have different lengths.

8. The interior permanent magnet synchronous motor of claim 6, wherein the two or more slits have common widths.

9. The interior permanent magnet synchronous motor of claim 6, wherein the two or more slits have different widths.

10. The interior permanent magnet synchronous motor of claim 2, wherein each slit among the plurality of slits is formed to become gradually narrower from a first end of the slit to a second end of the slit in the opposite direction of the rotation direction of the rotor.

11. The interior permanent magnet synchronous motor of claim 2, wherein each slit among the plurality of slits is formed to become gradually wider from a first end of the slit to a second end of the slit in the opposite direction of the rotation direction of the rotor.

12. The interior permanent magnet synchronous motor of claim 2, wherein each slit among the plurality of slits is convexly curved in the rotation direction of the rotor.

13. The interior permanent magnet synchronous motor of claim 2, wherein each slit among the plurality of slits is convexly curved in the opposite direction of the rotation direction of the rotor.

14. An interior permanent magnet synchronous motor, comprising:

a stator; and a rotor configured to be installed rotatably in a hollow region of the stator, wherein the rotor includes:

a plurality of permanent magnets in the rotor, and a slit arranged within a polar arc angle τ and toward a lead side of the polar arc angle τ, the slit is arranged to be inclined within a slit inclination range θ, the polar arc angle τ and the slit inclination range θ respectively satisfy the following equations:

$$\tau \mp = 360°/P$$

$$\frac{180°}{P} \le \theta \le \frac{180°}{P} + 90°$$

where P represents a number of poles of the rotor, the slit is positioned in a slit arrangement range φ in the polar arc angle τ, and the slit arrangement range φ satisfies the following equation:

$$0.2\tau \le \phi \le 0.5\tau, \text{ and}$$

the rotor is configured without a slit outside the slit arrangement range φ.

\* \* \* \* \*